US008965293B2

(12) United States Patent
Taghavi Nasrabadi et al.

(10) Patent No.: US 8,965,293 B2
(45) Date of Patent: Feb. 24, 2015

(54) INTERFERENCE MANAGEMENT

(75) Inventors: Mohammad Hossein Taghavi Nasrabadi, San Diego, CA (US); Hemanth Sampath, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 12/543,663

(22) Filed: Aug. 19, 2009

(65) Prior Publication Data
US 2010/0330918 A1 Dec. 30, 2010

Related U.S. Application Data

(60) Provisional application No. 61/220,787, filed on Jun. 26, 2009.

(51) Int. Cl.
*H04B 1/00* (2006.01)
*H04W 72/08* (2009.01)
*H04W 16/14* (2009.01)
*H04W 28/04* (2009.01)
*H04W 92/20* (2009.01)

(52) U.S. Cl.
CPC ............ *H04W 72/082* (2013.01); *H04W 72/08* (2013.01); *H04W 16/14* (2013.01); *H04W 28/04* (2013.01); *H04W 92/20* (2013.01)
USPC ......................................... 455/63.1; 370/332

(58) Field of Classification Search
CPC ..... H04W 16/14; H04W 28/04; H04W 72/08; H04W 72/082; H04W 92/20
USPC ........................................................ 455/63.1
See application file for complete search history.

(56) References Cited

U.S. PATENT DOCUMENTS

| 6,459,901 | B1 | 10/2002 | Chawla et al. |
| 7,180,876 | B1 | 2/2007 | Henry et al. |
| 2003/0118015 | A1 | 6/2003 | Gunnarsson et al. |
| 2003/0147368 | A1 | 8/2003 | Eitan et al. |

(Continued)

FOREIGN PATENT DOCUMENTS

| CN | 101193351 A | 6/2008 |
| CN | 101197653 A | 6/2008 |

(Continued)

OTHER PUBLICATIONS

Anonymous: "Method to increase power efficiency in a mixed GSM/UMTS network" Research Disclosure, Mason Publications, Hampshire, GB, vol. 471, No. 88, Jul. 1, 2003 XP007133045, p. 4 lines 23-40.

(Continued)

*Primary Examiner* — David Bilodeau
(74) *Attorney, Agent, or Firm* — Steven R. Thiel

(57) ABSTRACT

An apparatus for wireless communication is provided including a processing system. The processing system is configured to determine potential interference from communications with a first wireless node within a first coverage area through a first wireless interface, and to manage the potential interference when communicating with a neighboring apparatus within a second coverage area through a second wireless interface. The second coverage area is greater than the first coverage area and the neighboring apparatus is outside the first coverage area.

60 Claims, 3 Drawing Sheets

(56) References Cited

U.S. PATENT DOCUMENTS

| | | |
|---|---|---|
| 2004/0259558 A1 | 12/2004 | Skafidas et al. |
| 2007/0153749 A1 | 7/2007 | Waxman |
| 2007/0242621 A1* | 10/2007 | Nandagopalan et al. ..... 370/254 |
| 2007/0265009 A1 | 11/2007 | Hamaguchi |
| 2008/0046542 A1 | 2/2008 | Sano |
| 2008/0130481 A1 | 6/2008 | Fujii et al. |
| 2008/0207230 A1 | 8/2008 | Jung et al. |
| 2008/0259846 A1 | 10/2008 | Gonikberg et al. |
| 2008/0261602 A1 | 10/2008 | Livneh |
| 2009/0042593 A1 | 2/2009 | Yavuz et al. |
| 2009/0080386 A1* | 3/2009 | Yavuz et al. ............... 370/337 |
| 2009/0080499 A1* | 3/2009 | Yavuz et al. ............... 375/144 |
| 2009/0082027 A1* | 3/2009 | Yavuz et al. ............... 455/446 |
| 2009/0137241 A1* | 5/2009 | Yavuz et al. ............... 455/423 |
| 2009/0168676 A1 | 7/2009 | Olson |
| 2009/0170542 A1 | 7/2009 | Chen et al. |
| 2009/0196245 A1* | 8/2009 | Ji ................................ 370/329 |
| 2009/0247084 A1* | 10/2009 | Palanki ........................ 455/63.1 |
| 2009/0247181 A1* | 10/2009 | Palanki et al. ............. 455/452.2 |
| 2009/0290550 A1* | 11/2009 | Bhattad et al. ............... 370/329 |
| 2010/0008282 A1* | 1/2010 | Bhattad et al. ............... 370/312 |
| 2010/0085924 A1 | 4/2010 | Hamabe et al. |
| 2010/0240386 A1* | 9/2010 | Hamabe et al. ............ 455/452.2 |
| 2010/0330917 A1* | 12/2010 | Choi et al. ................... 455/63.1 |
| 2010/0331056 A1 | 12/2010 | Taghavi Nasrabadi et al. |
| 2011/0019529 A1* | 1/2011 | Wang et al. ................. 370/209 |
| 2011/0111779 A1* | 5/2011 | Krishnamurthy et al. .... 455/501 |
| 2011/0116480 A1* | 5/2011 | Li et al. ....................... 370/332 |

FOREIGN PATENT DOCUMENTS

| | | |
|---|---|---|
| EP | 1261141 | 11/2002 |
| JP | H06244785 A | 9/1994 |
| JP | 2005080197 A | 3/2005 |
| JP | 2005159965 A | 6/2005 |
| JP | 2007306201 A | 11/2007 |
| JP | 2008167413 A | 7/2008 |
| JP | 2008187555 A | 8/2008 |
| JP | 2008205765 A | 9/2008 |
| TW | M300925 U | 11/2006 |
| WO | WO2004079999 | 9/2004 |
| WO | WO-2004091244 A1 | 10/2004 |
| WO | 2008035661 A1 | 3/2008 |
| WO | WO2009068727 | 6/2009 |

OTHER PUBLICATIONS

International Search Report and Written Opinion—PCT/US2010/040080, International Search Authority—European Patent Office—Oct. 4, 2010.

Sarperi Luciano et al., "Avoiding data channel femto-macro interference," IEEE C802.16M-08/1366R1, IEEE, US, Nov. 12, 2008, pp. 1-3, XP007908600.

Sarperi Luciano et al., "Interference mitigation for closed user groups femtocells," IEEE C802.16M-08/1315R1, IEEE US, [OnLine] Oct. 31, 2008, pp. 1-4, XP007908599. Retrieved from the Internet: URL:<http://wirelessman.org/tgm/contrib/C80216m-08_1315r1.doc>.

Wakukawa, T., et al., "Impress Standard Textbook Series, Mobile IP Textbook," Impress R & D, 1st ed., Mar. 21, 2009, pp. 24, ISBN: 978-4-8433-2687-8.

* cited by examiner

US 8,965,293 B2

INTERFERENCE MANAGEMENT

CROSS-REFERENCE TO RELATED APPLICATION(S)

Pursuant to 35 U.S.C. §119(e), this application claims the benefit of U.S. Provisional Application Ser. No. 61/220,787 filed on Jun. 26, 2009, the contents of which are hereby incorporated by reference herein in their entirety.

BACKGROUND

1. Field

The following description relates generally to communication systems and, more particularly, to interference management.

2. Background

Interference management is one of the major challenges in wireless network. Interference management becomes even more difficult with the use of directional antennas, as well as radios operating at high-frequency (HF) bands with severe path loss, such as the 60 GHz band.

SUMMARY

In an aspect of the disclosure, an apparatus for wireless communication is provided including a processing system. The processing system is configured to determine potential interference from communications with a first wireless node within a first coverage area through a first wireless interface, and to manage the potential interference when communicating with a neighboring apparatus within a second coverage area through a second wireless interface. The second coverage area is greater than the first coverage area and the neighboring apparatus is outside the first coverage area.

In an aspect of the disclosure, a method for wireless communication is provided. Potential interference is determined from communications with a first wireless node within a first coverage area through a first wireless interface. The potential interference is managed when communicating with a neighboring apparatus within a second coverage area through a second wireless interface. The second coverage area is greater than the first coverage area and the neighboring apparatus is outside the first coverage area.

In an aspect of the disclosure, an access point is provided including one or more antennas, a first wireless interface, a second wireless interface, and a processing system. The first wireless interface is configured to support communications within a first coverage area via at least one of the one or more antennas. The second wireless interface is configured to support communications within a second coverage area via at least one of the one or more antennas. The second coverage area is greater than the first coverage area. The processing system configured to determine potential interference from communications with a first wireless node within the first coverage area through the first wireless interface. The processing system is further configured to manage the potential interference when communicating with a neighboring apparatus within the second coverage area through the second wireless interface. The neighboring apparatus is outside the first coverage area.

In an aspect of the disclosure, a station is provided including a first wireless interface, a second wireless interface, a user interface, and a processing system. The first wireless interface is configured to support communications within a first coverage area. The second wireless interface is configured to support communications within a second coverage area greater than the first coverage area. The processing system is configured to determine potential interference from communications with a first wireless node within a first coverage area through a first wireless interface. The processing system is further configured to manage the potential interference when communicating with a neighboring apparatus within a second coverage area through a second wireless interface. The communication is based on input from the user interface. The neighboring apparatus is outside the first coverage area.

DETAILED DESCRIPTION

Figure 1:
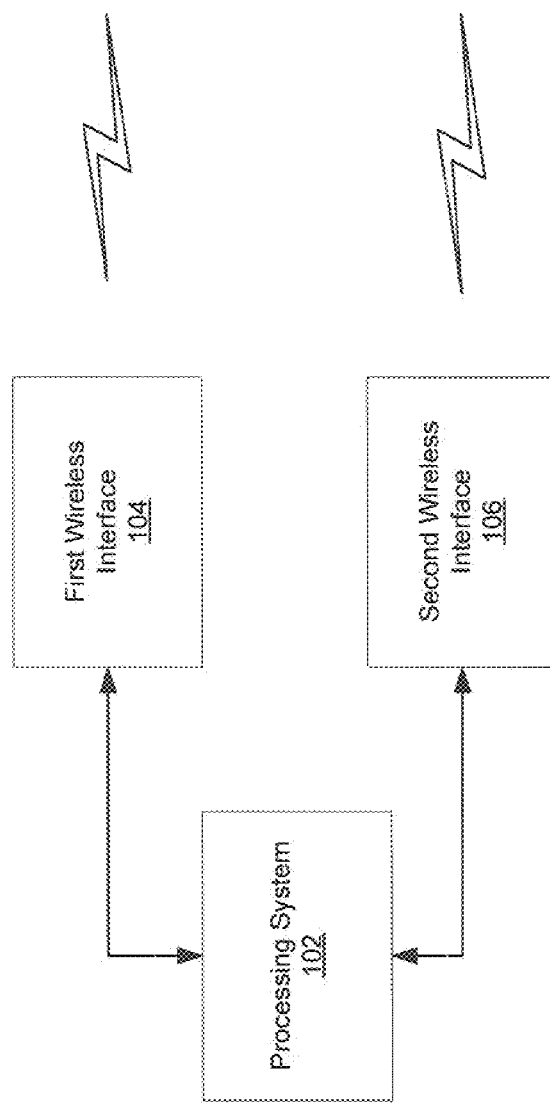
FIG. 1 is a conceptual block diagram illustrating the hardware configuration for an exemplary apparatus.

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, an access point (AP) and a station (STA) capable of operating in a wireless communications system. The wireless communications system may be configured to support APs and STAs employing Multiple-Input and Multiple-Output (MIMO) technology supporting any suitable wireless technology, such as Orthogonal Frequency Division Multiplexing (OFDM). An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard. The various concepts presented throughout this disclosure may also be extended to short range radio technology, such as Ultra-Wide Band (UWB), or some other short range air interface standard such as Bluetooth. The actual wireless technology and air interface standard employed for any particular communications system will depend on the specific application and the overall design constraints imposed on the system. The various concepts presented throughout this disclosure are equally applicable to a wireless communications system employing other wireless technologies and/or air interface standards.

The wireless communications system may support any number of APs distributed throughout a geographic region to provide coverage for STAs. An AP is generally a fixed terminal that provides backhaul services to STAs in the geographic region of coverage. However, the AP may be mobile in some applications. A STA, which may be fixed or mobile, utilizes the backhaul services of an AP or engages in peer-to-peer communications with other STAs. Examples of STAs include a mobile telephone, laptop computer, a personal digital assistant (PDA), a mobile digital audio player, a mobile game console, a digital camera, a digital camcorder, a mobile audio device, a mobile video device, a mobile multimedia device, or any other suitable device capable of supporting wireless communications.

An AP or STA may be referred to by those skilled in the art by different nomenclature. By way of example, an AP may be referred to as a base station, a base transceiver station, a wireless device, a terminal, a node, or some other suitable terminology.

Similarly, a STA may be referred to as a user terminal, a mobile station, a subscriber station, a wireless device, a terminal, an access terminal, a node, or some other suitable terminology. The various concepts described throughout this disclosure are intended to apply to all suitable apparatuses regardless of their specific nomenclature.

Various aspects of an apparatus will now be presented with reference to FIG. 1. FIG. 1 is a conceptual block diagram illustrating a hardware configuration for an apparatus. The apparatus 100 may include a processing system 102, a first wireless interface 104 and a second wireless interface 106.

The first and second wireless interfaces 104, 106 may support different air interface protocols. By way of example, the first wireless interface 104 may include a 60 GHz HF radio to support IEEE 802.11ad (Extremely High Throughput) and the second wireless interface 106 may include a lower frequency radio to support legacy IEEE 802.11, Bluetooth, cellular, or some other suitable air interface protocol. Each wireless interface 104, 106 may also be configured to implement the physical layer by modulating wireless signals and performing other radio frequency (RF) front end processing. Alternatively, the physical layer processing function may be performed by the processing system 102.

The first and second wireless interfaces 104, 106 are shown as separate entities. However, as those skilled in the art will readily appreciate, the first and second wireless interfaces 104, 106 may be integrated into a single entity. Alternatively, the first and second wireless interfaces 104, 106, or any portion thereof, may be integrated into the processing system 102, or distributed across multiple entities within the apparatus 100.

The processing system 102 may be implemented with one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 102 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 102 to perform the various functions described below, as well as other protocol processing functions (e.g., data link layer processing).

Machine-readable media may include storage integrated into one or more of the processors. Machine-readable media may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

Figure 2:
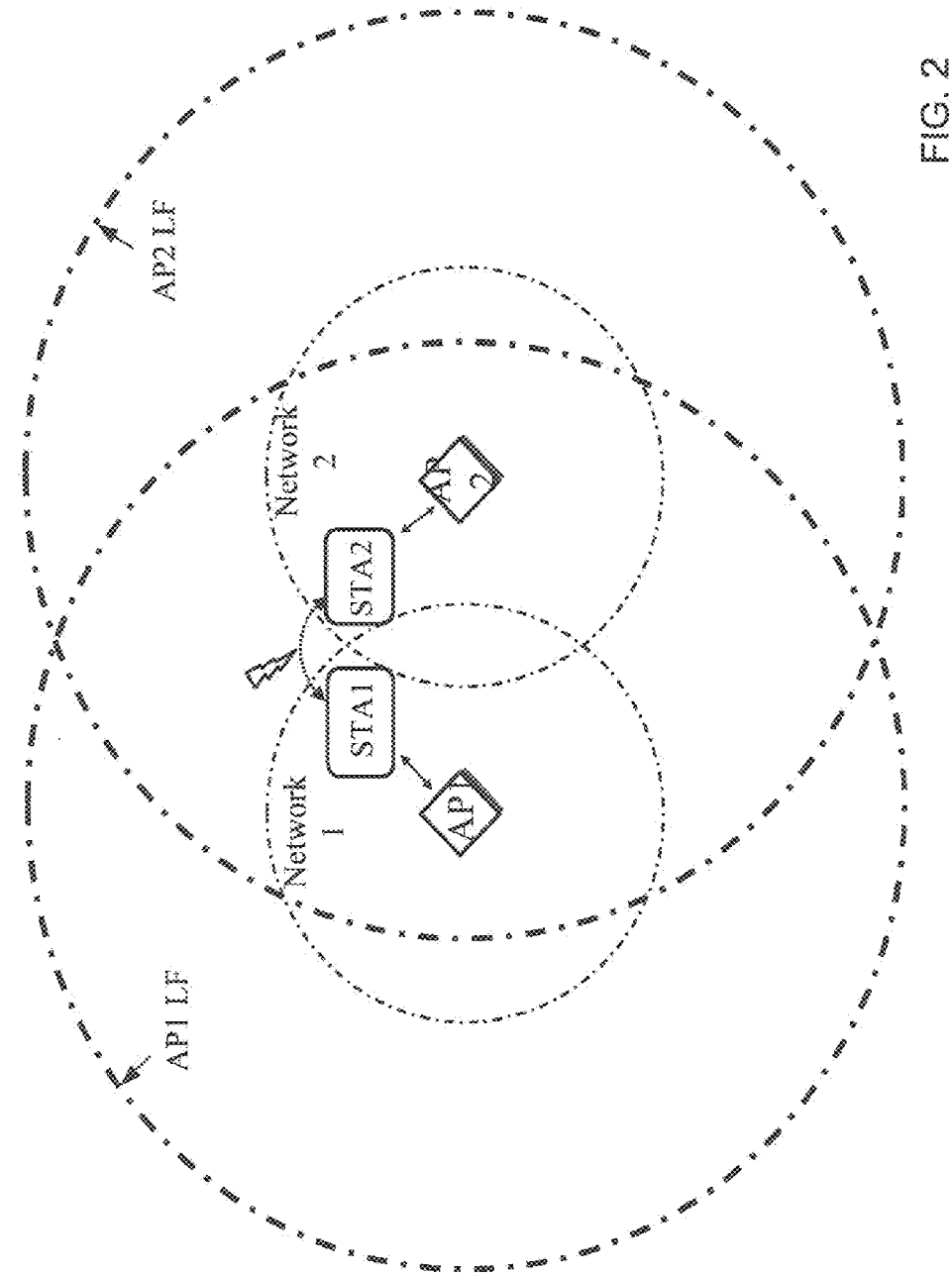
FIG. 2 is a conceptual diagram illustrating an example of communications in a wireless communications system.

Various aspects of several apparatuses operating in a wireless communications system will now be presented with reference to FIG. 2. FIG. 2 is a conceptual diagram illustrating an example of communications in a wireless communications system. In this example, the wireless communications system includes two wireless networks. Each wireless network includes an AP and a number of STAs, where the management tasks, such as synchronization and channel time allocation are done by the AP.

In this example, two independent networks are operating in close proximity, denoted by Network 1 and Network 2, with corresponding access points AP1 and AP2, respectively. Assume that STA1, which is located near the edge of the Network 1 coverage area of AP1, tries to receive a message from AP1 and detects interference from STA2 transmitting in Network 2.

In this situation, the two networks need to coordinate their transmission times or frequencies in order to avoid interference. However, AP1 is out of the coverage areas of both AP2 and STA2, and cannot sense the transmissions from STA2. Hence, AP1 cannot coordinate transmissions with AP2 to avoid interference.

In one configuration, AP1 and AP2 employ dual-band or multi-band radios with the first wireless interface 104 having an HF radio and the second wireless interface 106 having one or more lower-frequency (LF) radios (e.g., operating in the 2.4 GHz or 5 GHz bands, in addition to the HF radio). In this contribution, the use of LF radios of such devices is proposed to assist interference management in HF networks.

In networks with dual-band stations, the LF radio, due to its lower path loss, can be utilized in order to improve the interference management of HF links. As depicted in FIG. 2, the LF radios of AP1 and AP2 have a longer range (indicated as AP1 LF and AP2 LF) than their respective HF radios with ranges within Network 1 and Network 2, respectively. As such, both AP1 and AP2 may utilize their LF radios to communicate together in order to improve the interference management of the HF links, depicted within Network 1 and Network 2, respectively.

In one configuration, the AP1 and the AP2 of the two adjacent networks need to establish some level of coordination to avoid collision. While the HF transmissions from one AP cannot be heard by the other AP, the communication range of the LF radios might be sufficient for the two APs to establish a link for exchanging management messages. Such a link may be formed according to the existing protocol of the LF system for peer-to-peer communication.

In order to establish coordination, the AP1 and the AP2 first detect whether there is interference. The APs may detect interference through one of the following methods:

(1) If STA1 is unable to detect the message from AP1 due to interference from the neighboring network, AP1 will repeatedly fail to receive acknowledgement (ACK) from STA1. This can be an indication that STA1 is experiencing interference.

(2) Each AP may periodically monitor the existence of neighboring networks by transmitting beacons on the LF channel, and respond to such beacons transmitted from the other APs. By this scheme, the APs can obtain an estimate of the geometry of the other network, and can also predict the possibility of interference between the networks on the HF channel, using the path loss equations.

Once the possibility of interference is detected, the two APs establish a common LF link (according to the existing LF protocol). The APs can then perform interference management through one of the following schemes:

(1) Negotiate the frequency bands: If other HF bands are available, one of the APs may switch the HF frequency band of its corresponding network to another available band. The frequency bands may also be negotiated for initial channel selection when the APs are powered up.

(2) For synchronized networks, the APs can time-orthogonalize the contention intervals and transmission times. If the contention intervals are orthogonalized between the two networks, and furthermore if the STA1 and STA2 data transmission times are orthogonalized, then the STA1 and STA2, which are in two different networks but are within each others' communication ranges, can avoid collision when both try to communicate with the APs at the same time. When two STAs in the two networks, which are not within each others' ranges, contend during this interval, both can get access and can communicate with the corresponding APs simultaneously, without interference, hence avoiding the sharing of channel time.

(3) The APs can re-arrange the networks by changing the network geometry or topology to avoid interference. For example, one of the networks can merge with the other network as a dependent network. Channel time would be shared between the two networks and communication between the two APs would be performed over the LF link. In another example, interfering STAs could be commanded to move or to join the other network.

Figure 3:
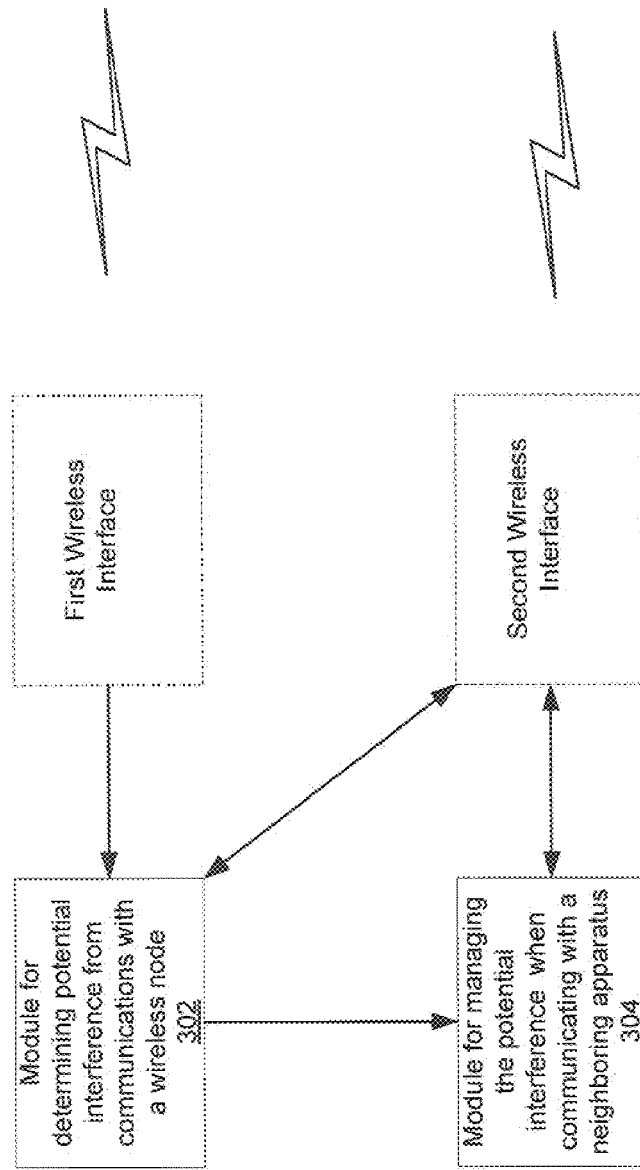
FIG. 3 is a conceptual block diagram illustrating the functionality of an exemplary apparatus.

FIG. 3 is a conceptual block diagram illustrating the functionality of an exemplary apparatus. The apparatus includes a module 302 for determining potential interference from communications with a first wireless node within a first coverage area through a first wireless interface, and a module 304 for managing the potential interference when communicating with a neighboring apparatus within a second coverage area through a second wireless interface when the second coverage area is greater than the first coverage area and the neighboring apparatus is outside the first coverage area. The modules 302, 304 of the apparatus are modules within the processing system 102 (see FIG. 1). As such, the means for determining potential inference and the means for managing the potential interference is the processing system 102.

In one configuration, the first wireless interface supports shorter-range HF communication and the second wireless interface supports longer-range LF communication. In another configuration, the first wireless interface supports communications at a first bandwidth and the second wireless interface supports communications at a second bandwidth different from the first bandwidth. In yet another configuration, the first wireless interface includes a first antenna and the second wireless interface includes a second antenna different from the first antenna. In each of the configurations, the second wireless interface is more capable of supporting communication between the apparatus and other APs that are out of range of the first wireless interface.

The module 302 determines potential interference with communication between the apparatus and a wireless node within the range of the first wireless interface. The module 302 may detect interference through receiving a message from the wireless node indicating interference, failing to receive an acknowledgment from the wireless node, detecting a signal from another wireless node, detecting a signal from a neighboring AP, or determining a distance of the neighboring AP through beacons/pilots received through the second wireless interface or through location information sent by the neighboring AP and received through the second wireless interface.

Even if a signal detected from a neighboring AP is incomprehensible, the signal may be sufficient for the module 302 to determine that the neighboring AP is operating in a network close enough to cause interference. The module 302 may detect actual interference through detecting that the signal from the neighboring AP is corrupted.

When the module 302 determines a distance of the neighboring AP through received pilots, the module 302 may determine the distance based on (a) strengths of the received pilots and a path-loss model for the second wireless interface; or (b) an arrival time of the received pilots.

Once a potential or actual interference is determined, the module 304 may manage the interference by negotiating with the neighboring AP frequency bands within which to communicate in their respective networks, by exchanging timing information and synchronizing the timing related to the first wireless interface with the neighboring AP, or by coordinating scheduling of the first wireless interface with the neighboring AP in order to avoid any interference. In one configuration, the module 304 schedules dedicated channel communication at different time periods than dedicated channel communications for the neighboring AP. In another configuration, the module 304 schedules common access communication at different time periods than common access communications for the neighboring AP. In yet another configuration, the module 304 negotiates dividing the channel time with the neighboring AP.

To avoid any interference, the module 304 may alternatively command the neighboring AP to merge with the apparatus as a dependent network or may rearrange network connectivity of the wireless nodes within its network or a neighboring network. The module 304 may rearrange network connectivity by commanding a wireless node to associate with a different network or by informing the wireless node that communication services can no longer be offered through the apparatus.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, and C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communication, comprising:
   a processing system configured to:
   transmit a first downlink signal to a first wireless node via a first wireless interface;
   determine potential interference with a reception of the first downlink signal by the first wireless node within a first coverage area, wherein the potential interference is due to an uplink signal transmitted by a second wireless node within a second coverage area serviced by a neighboring apparatus, the potential interference not being due to a second downlink signal transmitted by the neighboring apparatus; and
   manage the potential interference based on communication with the neighboring apparatus within a third coverage area through a second wireless interface;
   wherein the third coverage area is greater than the first coverage area.

2. The apparatus of claim 1, wherein the first wireless interface is associated with a first frequency and the second wireless interface is associated with a second frequency lower than the first frequency.

3. The apparatus of claim 1, wherein the first wireless interface is associated with a first bandwidth and the second wireless interface is associated with a second bandwidth different from the first bandwidth.

4. The apparatus of claim 1, wherein the processing system is further configured to communicate with the first wireless node through a first antenna and communicate with the neighboring apparatus through a second antenna different from the first antenna.

5. The apparatus of claim 1, wherein the processing system is further configured to determine the potential interference based on at least one of (a) receiving a message from the first wireless node indicating interference, (b) failing to receive an acknowledgement from the first wireless node, (c) detecting a signal from the second wireless node, (d) detecting a signal from the neighboring apparatus, or (e) determining a distance to the neighboring apparatus.

6. The apparatus of claim 5, wherein the processing system is further configured to determine the distance to the neighboring apparatus based on a reference signal received from the neighboring apparatus.

7. The apparatus of claim 6, wherein the processing system is further configured to determine the distance to the neighboring apparatus based on a strength of the received reference signal and a path-loss model for the second wireless interface.

8. The apparatus of claim 6, wherein the processing system is further configured to determine the distance to the neighboring apparatus based on an arrival time of the reference signal.

9. The apparatus of claim 5, wherein the processing system is further configured to determine the distance to the neighboring apparatus based on location information received from the neighboring apparatus.

10. The apparatus of claim 1, wherein the processing system is further configured to manage the potential interference by negotiating with the neighboring apparatus, frequency bands to communicate.

11. The apparatus of claim 1, wherein the processing system is further configured to exchange with the neighboring apparatus, through the second wireless interface, timing information related to the first wireless interface to manage the potential interference.

12. The apparatus of claim 1, wherein the processing system is further configured to schedule with the neighboring apparatus, through the second wireless interface, communications via the first wireless interface to manage the potential interference.

13. The apparatus of claim 12, wherein the processing system is further configured to schedule dedicated channel communication for the apparatus at different time periods than dedicated channel communication for the neighboring apparatus to manage the potential interference.

14. The apparatus of claim 12, wherein the processing system is further configured to schedule common access communication for the apparatus at different time periods than common access communication for the neighboring apparatus to manage the potential interference.

15. The apparatus of claim 12, wherein the processing system is further configured to divide communication time between the apparatus and the neighboring apparatus to manage the potential interference.

16. The apparatus of claim 1, wherein the processing system is further configured to manage the potential interference by requesting the neighboring apparatus to merge with the apparatus as a dependent network.

17. The apparatus of claim 1, wherein the processing system is further configured to manage the potential interference by rearranging network connectivity for the first wireless node in communication with the apparatus or the second wireless node in communication with the neighboring apparatus.

18. The apparatus of claim 17, wherein the rearrangement comprises requesting the first or second wireless node to associate with a third apparatus.

19. The apparatus of claim 17, wherein the rearrangement comprises informing the first or second wireless node that the apparatus or the neighboring apparatus can no longer provide communication services to the first or second wireless node, respectively.

20. A method for wireless communication, comprising:
    transmitting, by an apparatus, a first downlink signal to a first wireless node via a first wireless interface;
    determining potential interference with a reception of the first downlink signal by the first wireless node within a first coverage area, wherein the potential interference is due to an uplink signal transmitted by a second wireless node within a second coverage area serviced by a neighboring apparatus, the potential interference not being due to a second downlink signal transmitted by the neighboring apparatus; and managing the potential interference based on communication with the neighboring apparatus within a third coverage area through a second wireless interface;
wherein the third coverage area is greater than the first coverage area.

21. The method of claim 20, wherein the first wireless interface is associated with a first frequency and the second wireless interface is associated with a second frequency lower than the first frequency.

22. The method of claim 20, wherein the first wireless interface is associated with a first bandwidth and the second wireless interface is associated with a second bandwidth different from the first bandwidth.

23. The method of claim 20, further comprising communicating with the first wireless node through a first antenna and communicating with the neighboring apparatus through a second antenna different from the first antenna.

24. The method of claim 20, wherein the potential interference is determined based on at least one of (a) receiving a message from the first wireless node indicating interference, (b) failing to receive an acknowledgement from the first wireless node, (c) detecting a signal from the second wireless node, (d) detecting a signal from the neighboring apparatus, or (e) determining a distance between the apparatus and the neighboring apparatus.

25. The method of claim 24, wherein the potential interference is determined by determining the distance based on a reference signal received from the neighboring apparatus.

26. The method of claim 25, wherein the potential interference is determined by determining the distance based on a strength of the received reference signal and a path-loss model for the second wireless interface.

27. The method of claim 25, wherein the potential interference is determined by determining the distance based on an arrival time of the reference signal.

28. The method of claim 24, wherein the potential interference is determined by determining the distance based on location information received from the neighboring apparatus.

29. The method of claim 20, wherein the potential interference is managed by negotiating with the neighboring apparatus, respective frequency bands to communicate.

30. The method of claim 20, further comprising exchanging with the neighboring apparatus, through the second wireless interface, timing information related to the first wireless interface to manage the potential interference.

31. The method of claim 20, further comprising scheduling with the neighboring apparatus, through the second wireless interface, communications via the first wireless interface to manage the potential interference.

32. The method of claim 31, wherein dedicated channel communication for the apparatus is scheduled at different time periods than dedicated channel communication for the neighboring apparatus to manage the potential interference.

33. The method of claim 31, wherein common access communication for the apparatus is scheduled at different time periods than common access communication for the neighboring apparatus to manage the potential interference.

34. The method of claim 31, wherein the communication time for the apparatus is divided with the neighboring apparatus to manage the potential interference.

35. The method of claim 20, wherein the potential interference is managed by requesting the neighboring apparatus to merge with the apparatus as a dependent network.

36. The method of claim 20, wherein the potential interference is managed by rearranging network connectivity for the first wireless node in communication with the apparatus or the second wireless node in communication with the neighboring apparatus.

37. The method of claim 36, wherein the rearrangement of network connectivity comprises requesting the first or second wireless node to associate with a third apparatus.

38. The method of claim 36, wherein the rearrangement of network connectivity comprises informing the first or second wireless node that the apparatus or the neighboring apparatus can no longer provide communication services to the first or second wireless node, respectively.

39. A non-transitory computer-program product for communication, comprising:
a machine-readable medium comprising instructions executable to:
transmit, by an apparatus, a first downlink signal to a first wireless node via a first wireless interface;
determine potential interference with a reception of the first downlink signal by the first wireless node within a first coverage area, wherein the potential interference is due to an uplink signal transmitted by a second wireless node within a second coverage area serviced by a neighboring apparatus, the potential interference not being due to a second downlink signal transmitted by the neighboring apparatus; and
manage the potential interference based on communication with the neighboring apparatus within a third coverage area through a second wireless interface;
wherein the third coverage area is greater than the first coverage area.

40. An access point, comprising:
one or more antennas;
a first wireless interface configured to support communications within a first coverage area via at least one of the one or more antennas;
a second wireless interface configured to support communications within a second coverage area via at least one of the one or more antennas, wherein the second coverage area is greater than the first coverage area;
a processing system configured to:
transmit a first downlink signal to a first wireless node via the first wireless interface;
determine potential interference with a reception of the first downlink signal by the first wireless node within the first coverage area, wherein the potential interference is due to an uplink signal transmitted by a second wireless node within a third coverage area serviced by a neighboring apparatus, the potential interference not being due to a second downlink signal transmitted by the neighboring apparatus; and
manage the potential interference based on communication with the neighboring apparatus within the second coverage area through the second wireless interface.

41. A station, comprising:
a first wireless interface configured to support communications within a first coverage area;
a second wireless interface configured to support communications within a second coverage area greater than the first coverage area;
a user interface;
a processing system configured to:
transmit a first downlink signal to a first wireless node;
determine potential interference with a reception of the first downlink signal by the first wireless node within a first coverage area, wherein the potential interference is due to an uplink signal transmitted by a second wireless node within a third coverage area serviced by a neighboring apparatus, the potential interference not being due to a second downlink signal transmitted by the neighboring apparatus; and manage the potential interference based on communication with the neighboring apparatus within the second coverage area through a second wireless interface, the communication being based on input from the user interface.

42. An apparatus for wireless communication, comprising:

means for transmitting a first downlink signal to a first wireless node via a first wireless interface;

means for determining potential interference with a reception of the first downlink signal by the first wireless node within a first coverage area, wherein the potential interference is due to an uplink signal transmitted by a second wireless node within a second coverage area serviced by a neighboring apparatus, the potential interference not being due to a second downlink signal transmitted by the neighboring apparatus; and means for managing the potential interference based on communication with the neighboring apparatus within a third coverage area through a second wireless interface; wherein the third coverage area is greater than the first coverage area.

43. The apparatus of claim 42, wherein the first wireless interface is associated with a first frequency and the second wireless interface is associated with a second frequency lower than the first frequency.

44. The apparatus of claim 42, wherein the first wireless interface is associated with a first bandwidth and the second wireless interface is associated with a second bandwidth different from the first bandwidth.

45. The apparatus of claim 42, further comprising means for communicating with the first wireless node through a first antenna and communicating with the neighboring apparatus through a second antenna different from the first antenna.

46. The apparatus of claim 42, wherein the potential interference is determined based on at least one of (a) receiving a message from the first wireless node indicating interference, (b) failing to receive an acknowledgement from the first wireless node, (c) detecting a signal from the second wireless node, (d) detecting a signal from the neighboring apparatus, or (e) determining a distance to the neighboring apparatus.

47. The apparatus of claim 46, wherein the potential interference is determined by determining the distance to the neighboring apparatus based on a reference signal received from the neighboring apparatus.

48. The apparatus of claim 47, wherein the potential interference is determined by determining the distance to the neighboring apparatus based on a strength of the received reference signal and a path-loss model for the second wireless interface.

49. The apparatus of claim 47, wherein the potential interference is determined by determining the distance to the neighboring apparatus based on an arrival time of the reference signal.

50. The apparatus of claim 46, wherein the potential interference is determined by determining the distance to the neighboring apparatus based on location information received from the neighboring apparatus.

51. The apparatus of claim 42, wherein the potential interference is managed by negotiating with the neighboring apparatus, respective frequency bands to communicate.

52. The apparatus of claim 42, further comprising means for exchanging with the neighboring apparatus, through the second wireless interface, timing information related to the first wireless interface to manage the potential interference.

53. The apparatus of claim 42, further comprising means for scheduling with the neighboring apparatus, through the second wireless interface, communications via the first wireless interface to manage the potential interference.

54. The apparatus of claim 53, wherein dedicated channel communication for the apparatus is scheduled at different time periods than dedicated channel communication for the neighboring apparatus to manage the potential interference.

55. The apparatus of claim 53, wherein common access communication for the apparatus is scheduled at different time periods than common access communication for the neighboring apparatus to manage the potential interference.

56. The apparatus of claim 53, wherein the communication time for the apparatus is divided with the neighboring apparatus to manage the potential interference.

57. The apparatus of claim 42, wherein the potential interference is managed by requesting the neighboring apparatus to merge with the apparatus as a dependent network.

58. The apparatus of claim 42, wherein the potential interference is managed by rearranging network connectivity the first wireless node in communication with the apparatus or the second wireless node in communication with the neighboring apparatus.

59. The apparatus of claim 58, wherein the rearrangement of network connectivity comprises requesting the first or second wireless node to associate with a third apparatus.

60. The apparatus of claim 58, wherein the rearrangement of network connectivity comprises informing the first or second wireless node that the apparatus or the neighboring apparatus can no longer provide communication services to the first or second wireless node, respectively.

* * * * *